US007601265B2

(12) United States Patent
Rida et al.

(10) Patent No.: US 7,601,265 B2
(45) Date of Patent: Oct. 13, 2009

(54) APPARATUS FOR RETAINING MAGNETIC PARTICLES WITHIN A FLOW-THROUGH CELL

(75) Inventors: Amar Rida, Prilly (CH); Olivier Elsenhans, Sins (CH); Martin Gijs, Ecublens (CH); Goran Savatic, Reussbühl (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 856 days.

(21) Appl. No.: 10/502,556

(22) PCT Filed: Jan. 22, 2003

(86) PCT No.: PCT/EP03/00694

§ 371 (c)(1), (2), (4) Date: Mar. 22, 2005

(87) PCT Pub. No.: WO03/061835

PCT Pub. Date: Jul. 31, 2003

(65) Prior Publication Data

US 2005/0208464 A1 Sep. 22, 2005

(30) Foreign Application Priority Data

Jan. 23, 2002 (EP) .................................. 02075267

(51) Int. Cl.
*C02F 1/48* (2006.01)

(52) U.S. Cl. ........................ 210/695; 204/155; 204/242; 204/664; 209/214; 209/223.1; 209/226

(58) Field of Classification Search ................. 210/222, 210/223, 243, 695, 748; 209/1-4, 212-214, 209/223.1, 223.2, 225, 226, 231, 232; 204/155, 204/557, 664, 242; 422/101; 436/177, 526; 435/4, 287.2; 250/281, 298-300
See application file for complete search history.

(56) References Cited

U.S. PATENT DOCUMENTS 2,976,995 A 3/1961 Forrer ........................ 209/223

(Continued)

FOREIGN PATENT DOCUMENTS

EP 0 718 037 A2 6/1996

(Continued)

OTHER PUBLICATIONS

European Search Report.

*Primary Examiner*—Joseph W Drodge
(74) *Attorney, Agent, or Firm*—Charles M. Doyle

(57) ABSTRACT

An apparatus for retaining magnetic particles within a segment of a flow-through cell during flow of a fluid through the cell comprises (a) optionally, an electrical current source; (b) an electromagnet having a winding connected to the current source and an air gap between at least one pair of poles each of which has a corrugated outer surface and (c) a flow-through cell which is configured and dimensioned to receive an amount of magnetic particles to be retained within the flow-through cell and to allow flow of a liquid through the flow-through cell. The liquid carries molecules or particles to be captured by means of the magnetic particles. A portion of the flow-through cell is inserted in air gap.

42 Claims, 14 Drawing Sheets

U.S. PATENT DOCUMENTS

| | | | | |
|---|---|---|---|---|
| 3,482,685 A | | 12/1969 | Malden et al. | 209/5 |
| 4,209,394 A | | 6/1980 | Kelland | 210/42 S |
| 4,738,773 A | * | 4/1988 | Muller-Ruchholtz et al. | 435/29 |
| 5,465,849 A | | 11/1995 | Wada et al. | 209/214 |
| 5,541,072 A | | 7/1996 | Wang et al. | 435/7.21 |
| 5,565,365 A | | 10/1996 | Glass | 436/526 |
| 5,655,665 A | | 8/1997 | Allen et al. | 209/223.1 |
| 6,159,378 A | | 12/2000 | Holman et al. | 210/695 |

FOREIGN PATENT DOCUMENTS

| | | |
|---|---|---|
| FR | 1141536 | 1/1957 |
| WO | WO 99/19070 | 4/1999 |
| WO | WO 01/10558 A1 | 2/2001 |

* cited by examiner

APPARATUS FOR RETAINING MAGNETIC PARTICLES WITHIN A FLOW-THROUGH CELL

BACKGROUND OF THE INVENTION

This application claims the benefit of priority under 35 U.S.C. §119 of PCT/EP03/00694 filed Jan. 22, 2003 and EP Application 02075267.1 filed Jan. 23, 2002, the contents of which are hereby incorporated by reference.

FIELD OF THE INVENTION

The invention concerns an apparatus and a method for retaining magnetic particles within a segment of a flow-through cell during flow of a fluid through the cell.

The invention further concerns an apparatus and a method of the above kind which is in addition adapted for manipulating magnetic particles retained within a segment of a flow-through cell during flow of a fluid through the cell.

The invention concerns in particular an apparatus and a method of the above mentioned kinds wherein the magnetic particles are used for capturing target molecules or target particles suspended in and carried by a fluid flowing through a flow-through cell, as is done for instance in clinical chemistry assays for medical diagnostic purposes. The invention further concerns use of an apparatus and a method of the above mentioned kinds in the field of life sciences and in particular for in-vitro diagnostics.

BACKGROUND OF THE INVENTION

Magnetic separation and purification processes using magnetic particles as a solid extraction phase are widely used e.g. in clinical chemistry assays for medical diagnostic purposes, wherein target molecules or target particles are bound on suitable magnetic particles and labeled with a specific receptor, and these method steps are followed by a step wherein the magnetic particles carrying target particles bound on them are separated from the liquid where they were originally suspended by means of a high magnetic field gradient.

Within the scope of this description the terms target molecules or particles are used to designate in particular any biological components such as cells, cell components, bacteria, viruses, toxins, nucleic acids, hormones, proteins and any other complex molecules or the combination of thereof.

The magnetic particles used are e.g. paramagnetic or superparamagnetic particles with dimension ranging from nanometric to micrometric scales, for instance magnetic particles of the types mentioned in the publication of B. Sinclair, "To bead or not to bead," The Scientist, 12[13]:16-9, Jun. 22, 1998.

The term specific receptor is used herein to designate any substance which permits to realize a specific binding affinity for a given target molecule, for instance the antibody-antigen affinity (see e.g. U.S. Pat. No. 4,233,169) or glass affinity to nucleic acids in a salt medium (see e.g. U.S. Pat. No. 6,255, 477.

Several systems using magnetic separation and purification process have been developed during the two last decades and have led to a large variety of commercially available apparatus which are miniaturized and automated to some extent, but there has been relatively little progress in the development of the means used in those apparatuses for handling the magnetic particles. Basically the process comprises the step of mixing of a liquid sample containing the target molecules or particles with magnetic particles within a reservoir in order that the binding reaction takes place and this step is followed by a separation step of the complexes magnetic particle/target particle from the liquid by means of a permanent magnet or an electromagnet. Since this separation step is usually carried out with the liquid at rest, this step is known as static separation process. In some systems additional steps required for handling of the liquids involved (liquid sample, liquid reagent, liquid sample-reagent mixtures) are carried out by pipetting means.

A flow-through system for carrying out the separation of the magnetic particles, a so called dynamic separation system, is more advantageous than a static separation system, in particular because it makes possible to effect separation of magnetic particles and steps involving liquid processing with more simple means and with more flexibility.

However, only few magnetic separation systems are known and they have serious drawbacks. In most of them the magnetic particles retained build a cluster deposited on the inner wall of a flow-through cell and for this reason the perfusion of the target molecules is inefficient.

According to U.S. Pat. No. 6,159,378 this drawback can be partially overcome by inserting in the flow path of the liquid carrying the target molecules or target particles a filter structure made magnetic flux conducting material, and by applying a magnetic field to that filter structure. A serious drawback of this approach is that the filter structure is a source of contamination or cross-contamination problems.

SUMMARY OF THE INVENTION

In one embodiment, the present invention provides an apparatus and a method by which the magnetic particles retained are homogeneously distributed over the cross-section of the flow-through cell, so that liquid flowing through the flow-through cell flows through the retained particles and a maximum of the surfaces of the particles is contacted by the liquid during that flow, thereby enabling an efficient capture of the target molecules or target particles.

In another embodiment, the present invention provides an apparatus and a method in which the magnetic particles which serve for capturing target particles carried by a liquid sample which flows through a flow-through cell are so retained therein that they are homogeneously distributed in the interior of the flow-through cell, thereby enabling a highly effective perfusion of the particles retained, because the liquid sample carrying the target particles flows through a kind of filter structure built by the magnetic particles themselves, and this effect is obtained without having within the flow-through cell any component which might be a possible source of contamination or cross-contamination.

In another embodiment, the present invention provides an apparatus and a method such that usual steps like washing or eluting of the magnetic particles and of the target particles bound on them can also be effected with the same apparatus and this leads to a very rapid automated processing of sample liquids and to a corresponding reduction of the cost of such processing.

BRIEF DESCRIPTION OF THE DRAWINGS

The subject invention will now be described in terms of its preferred embodiments with reference to the accompanying drawings. These embodiments are set forth to aid the understanding of the invention, but are not to be construed as limiting.

DETAILED DESCRIPTION OF PREFERRED EXAMPLES

First Apparatus Example

Figure 2:
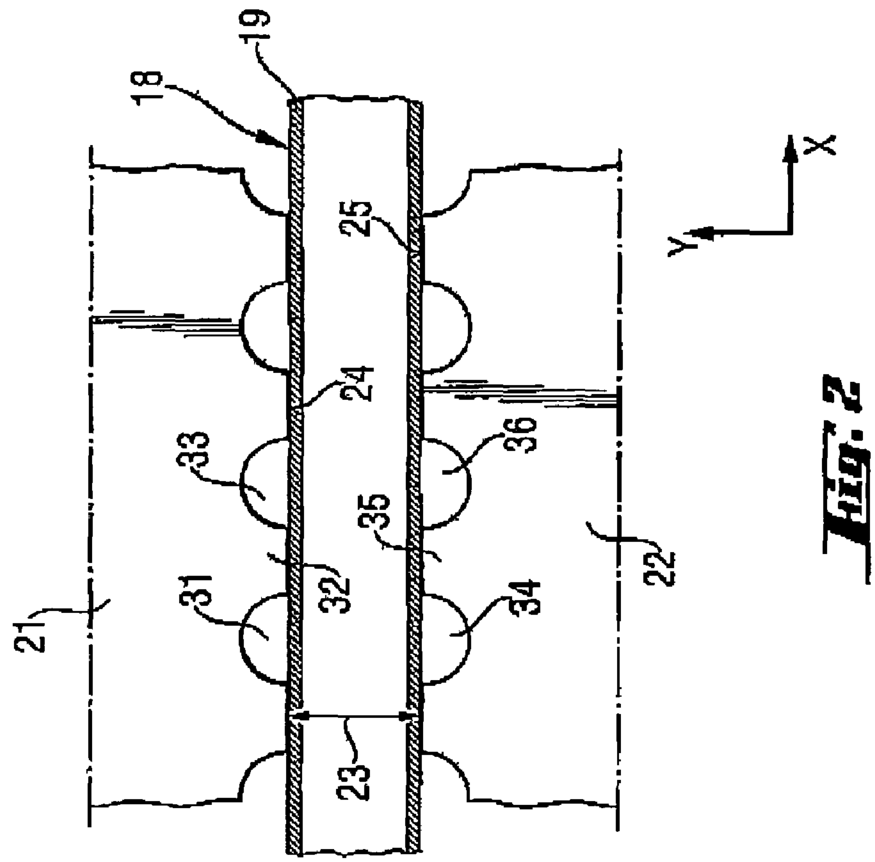
FIG. 2 shows an enlarged side view in the direction of arrow 20 in FIG. 1 and also related axis X and Y.
Figure 1:
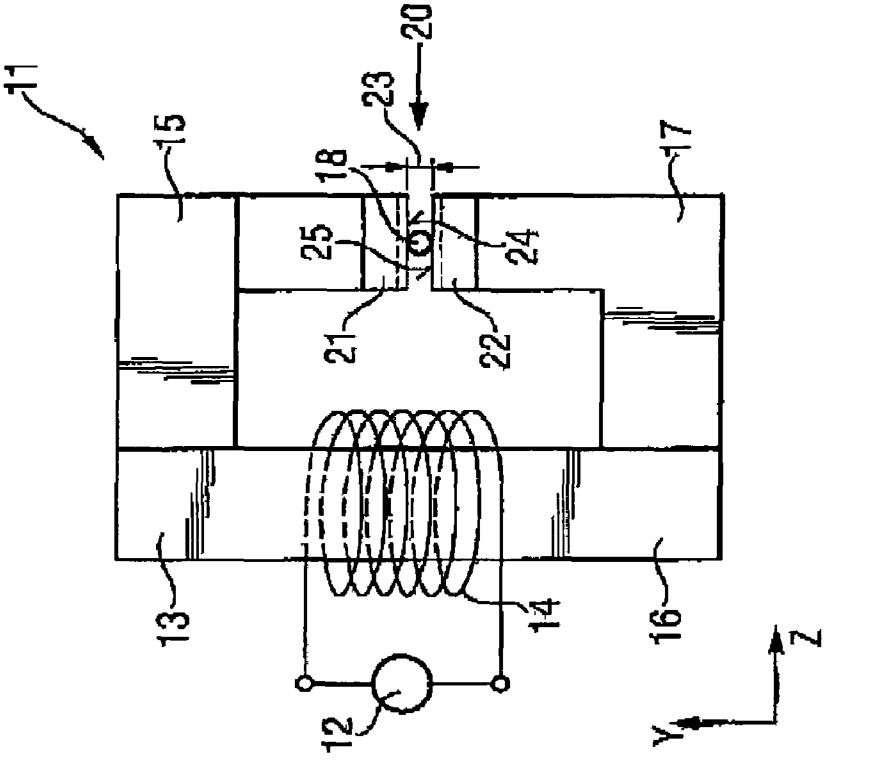
FIG. 1 shows a schematic front view of an apparatus according to the invention and also related axis Y and Z.

A first example of an apparatus according to the invention is described hereinafter with reference to FIGS. 1 to 10. FIG. 1 shows a schematic front view of an apparatus according to the invention and also related axis Y and Z. FIG. 2 shows an enlarged side view in the direction of arrow 20 in FIG. 1 and also related axis X and Y.

As shown by FIG. 1, an apparatus according to the invention comprises:

(a) optionally, an electrical current source 12;

(b) an electromagnet 13 comprising a winding 14 connected to the current source 12, and (c) a flow-through cell 18 which is configured and dimensioned to receive an amount of magnetic particles to be retained within a segment of the flow-through cell and to allow flow of a liquid through the flow-through cell.

In a preferred embodiment the electric current source 12 is a source adapted to provide a current which is variable with time, e.g. an alternating current source adapted to supply a current having a selectable frequency comprised between 0.001 cycle per second and 100 kilocycles per second.

In another embodiment electric current source 12 is a switchable DC current source.

In another embodiment electric current source 12 is a DC current source.

Figure 3:
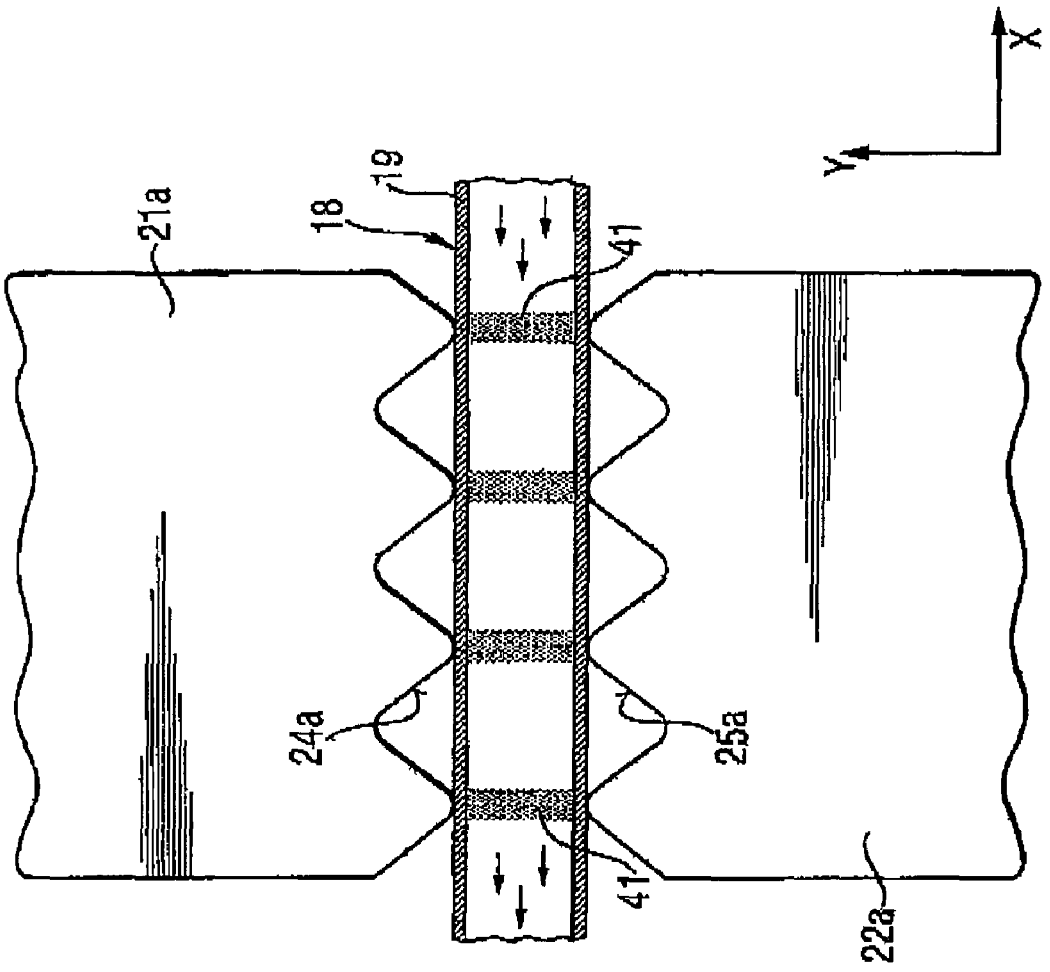
FIG. 3 an enlarged side view similar to FIG. 2 and showing the spatial distribution of magnetic particles retained within a segment of a flow-through cell.
Figure 8:
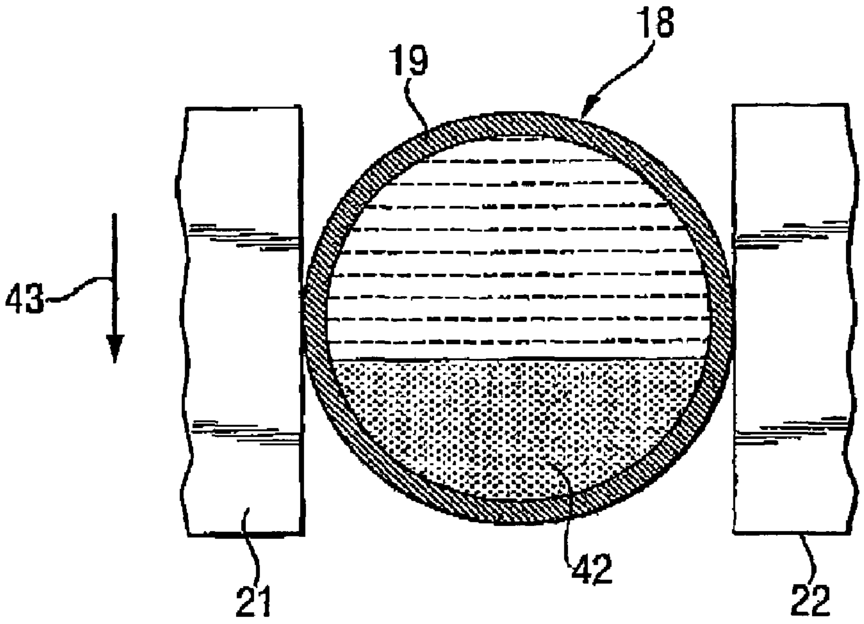
FIG. 8 shows a cross-sectional view of the distribution of the magnetic particles in flow-through cell 18 when they are under gravity force alone, that is with no magnetic field applied, or when a static magnetic field is applied and the density of magnetic particles is lower that a certain limit value.
Figure 9:
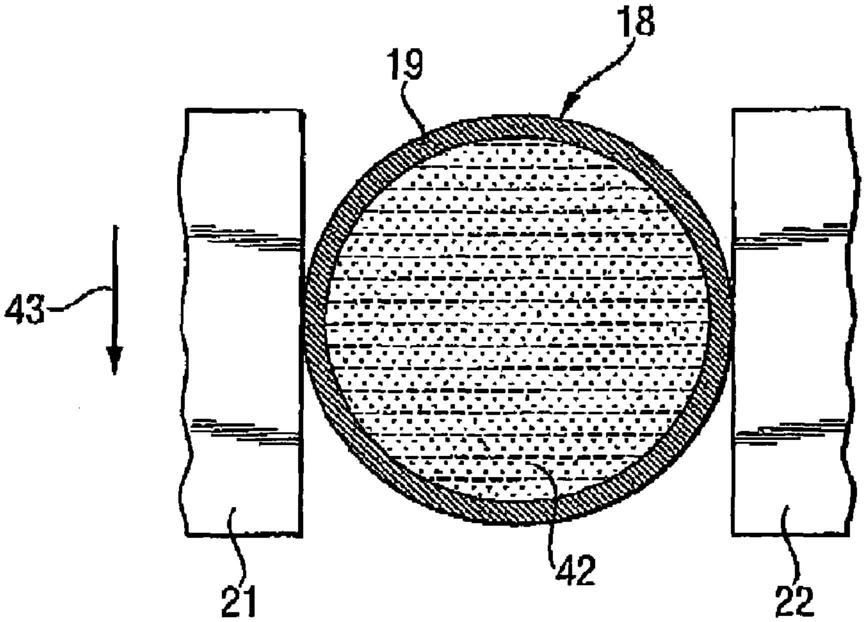
FIG. 9 shows a cross-sectional view of the distribution of the magnetic particles retained in flow-through cell 18 when an alternating magnetic field is applied according to the invention and even when a relatively low density of magnetic particles is used.

When a DC current is applied to winding 14, the magnetic particles migrate to the region were the magnetic field is highest following the spatial variation of the magnetic field, and this effect forms a periodic distribution of chains of magnetic particles located at different segments 41 along the channel of the flow-through cell as shown by FIG. 3. However, since the magnetic field is highest near the magnetic poles, the magnetic particles will be concentrated at the walls of the flow-through channel and near the magnetic poles. Moreover lateral observations of the tube cross-section show that the magnetic particles do not cover the whole cross section due to the deposition of the magnetic particles under gravity force as shown by FIG. 8. With such magnetic particle aggregations, a very low surface of the magnetic particles will be in contact with only a limited volume of the fluid flow. By increasing the magnetic particles density, one can systematically cover more cross-section surface of the flow-channel and thus increase the fluid flow volume which is in contact with the magnetic particles surface. Nevertheless, in this case the surface of the magnetic particles in contact with the fluid flow is still very low compared with their total volume and one could have a serious problem of backpressure and even the absence of a flow. This problem is overcome by applying an AC current to winding 14 in order to induce a local dynamic behavior of the magnetic particles. This dynamic behavior is dictated essentially by the fact that the minimum energy of a magnetic particle in an applied magnetic field is reached when the dipolar magnetic moment vector of this particle is parallel to the applied magnetic field. Under the influence of a magnetic field the magnetic particles tend to form chains which have particular dynamic behaviors at different frequencies of the magnetic field applied. At low frequencies, the magnetic particles form chain structures that behave like a dipole, which is reversed by a change of the magnetic field polarity. At high frequencies the magnetic particles have a vortex rotational dynamic. Such a rotational dynamic seems to be useful to provide a more efficient homogeneous distribution of the magnetic particles over the cross-section of the flow channel as shown by FIG. 9, even when a relatively low density of the magnetic particles is used. Moreover, this dynamic behavior is particularly interesting since it permit to have a more efficient interaction between the magnetic particles and the target particles carried by a liquid that flows through the flow-through cell.

Electromagnet 13 has at least one pair of poles 21, 22 separated by an air gap 23 which is much smaller than the overall dimensions of the electromagnet. Electromagnet 13 comprises yoke parts 15, 16, 17, pole end parts 21, 22 and a winding 14 connected to electrical current source 12.

Air gap 23 lies between outer surfaces 24, 25 of the ends of the poles. Each of these outer surfaces comprises the outer surfaces of at least two cavities 31, 33 respectively 34, 36 and of a tapered pole end part 32 respectively 35 which separates the two cavities 31, 33 respectively 34, 36 from each other. Air gap 23 has an average depth which lies between 0.1 and 10 millimeters.

Cavities 31, 33 and the tapered end part 32 of one of the poles 21 are arranged substantially opposite to and symmetrically with respect to the corresponding cavities 34, 36 and tapered end part 35 of the other pole 22 of the pair of poles. The depth of air gap 23 thereby varies at least along a first direction, e.g. the X-direction. This depth is measured along a second direction, e.g. the Y-direction, which is normal to the first direction. Air gap 23 has at least a first symmetry axis which extends along the first direction, i.e. the X-direction.

As can be appreciated from FIG. 2, in a preferred embodiment each of tapered pole end parts 32, 35 has a sharp edge. In another embodiment shown by FIG. 3, the cross-section of the outer surface 24*a*, 25*a* of the pole ends 21*a*, 22*a* has an undulated or sawtooth shape.

Each of tapered pole end parts 32, 35 has in general a three-dimensional shape and the cavities 31, 33 respectively 34, 36 and tapered pole end parts 32 respectively 35 form a corrugated surface. In preferred embodiments this corrugated surface has a thickness comprised between 0.1 and 10 millimeters.

Each of above mentioned tapered pole end parts, e.g. pole parts 21, 22, is made of a ferromagnetic material and preferably of a ferrite. Cavities 31, 33 respectively 34, 36 are made by a suitable process, e.g. by micro powder blasting.

Figure 4:
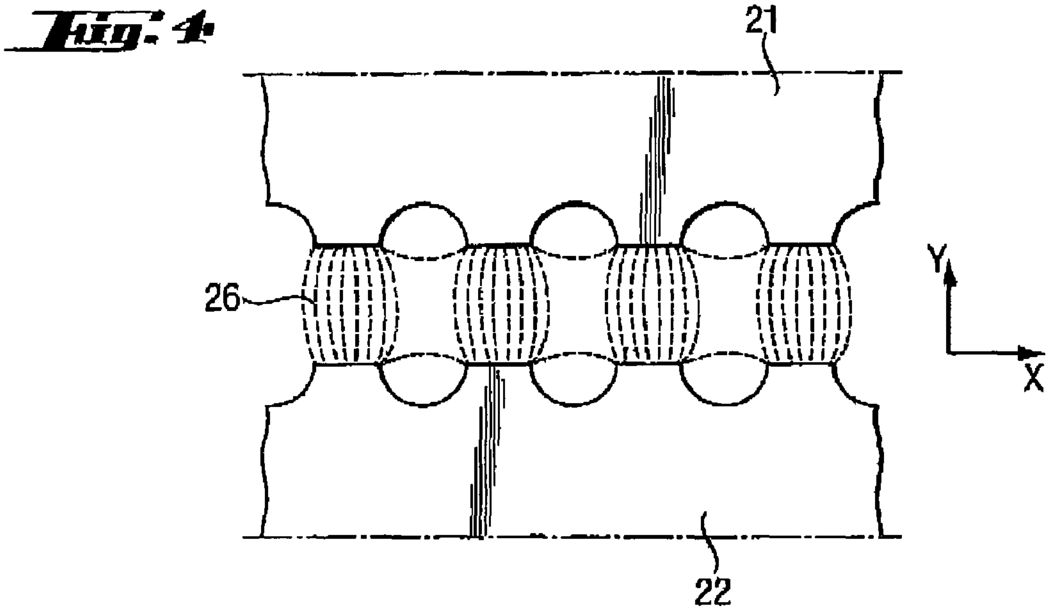
FIG. 4 shows an enlarged side view similar to FIG. 2 wherein it is schematically depicted that the pole tips of 21 and 22 generate a high magnetic field gradient over the entire cross-section of air gap 23.

As schematically shown by FIG. 4, pole tips of 21 and 22 generate a high magnetic field gradient over the entire cross-section of air gap 23. In FIG. 4 dashed lines represent magnetic field lines 26.

Figure 5:
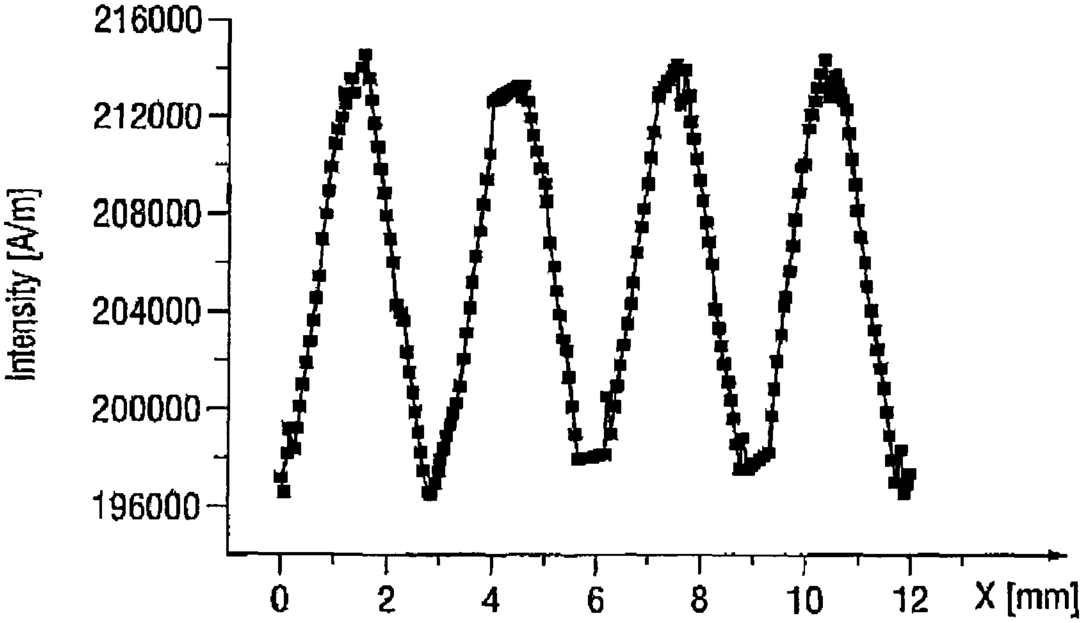
FIG. 5 is a diagram showing the spatial variation of the magnetic field intensity created with pole tips 21, 22 in FIG. 1 along the length axis (X-axis) at the middle of air gap 23.

FIG. 5 shows a diagram of a representative spatial variation of the magnetic field intensity created with pole tips 21, 22 in FIG. 1 along the length axis (X-axis) at the middle of air gap 23 and for a current density of 2 A/square millimeter. In this diagram the intensity of the magnetic field is expressed in Ampere/meter and the position along the X-axis is indicated by a length expressed in millimeters. As can be appreciated from FIG. 5, the magnetic field and the magnetic field gradient have simple and well defined periodic forms which are controlled by the electrical and geometrical characteristics of electromagnet 13, and in particular by the shape of the pole tips.

When flow-through cell 18 is used according to the invention, the liquid which flows through it carries target molecules or target particles to be captured by means of magnetic particles retained within the flow-through cell.

In another embodiment, flow-through cell 18 is made of a material which has no magnetic screening effect on a magnetic field generated by electromagnet 13.

A portion of the flow-through cell 18 is inserted in the air gap 23 in such a way that at least one area of the outer surface of each of the tapered pole parts 32, 35 is in contact with or is at least very close to the outer surface of a wall 19 of the flow-through cell and the length axis of the flow-through cell portion extends along the first direction, i.e. the X-direction.

The magnetic particles used are of the kind used for capturing target molecules or target particles carried by a liquid. The size of the magnetic particles lies in the nanometer or micrometer range.

In another embodiment, magnetic particles suitable for use within the scope of the invention have e.g. the following characteristics:

- a diameter of 2 to 5 micrometer
- a magnetic force of approximately 0.5 Newton per kilogram.

Properties of the magnetic particles suitable for use within the scope of the invention are described in particular in the following patent specifications: EP 1154443, EP 1144620, U.S. Pat. No. 6,255,477.

Figure 6:
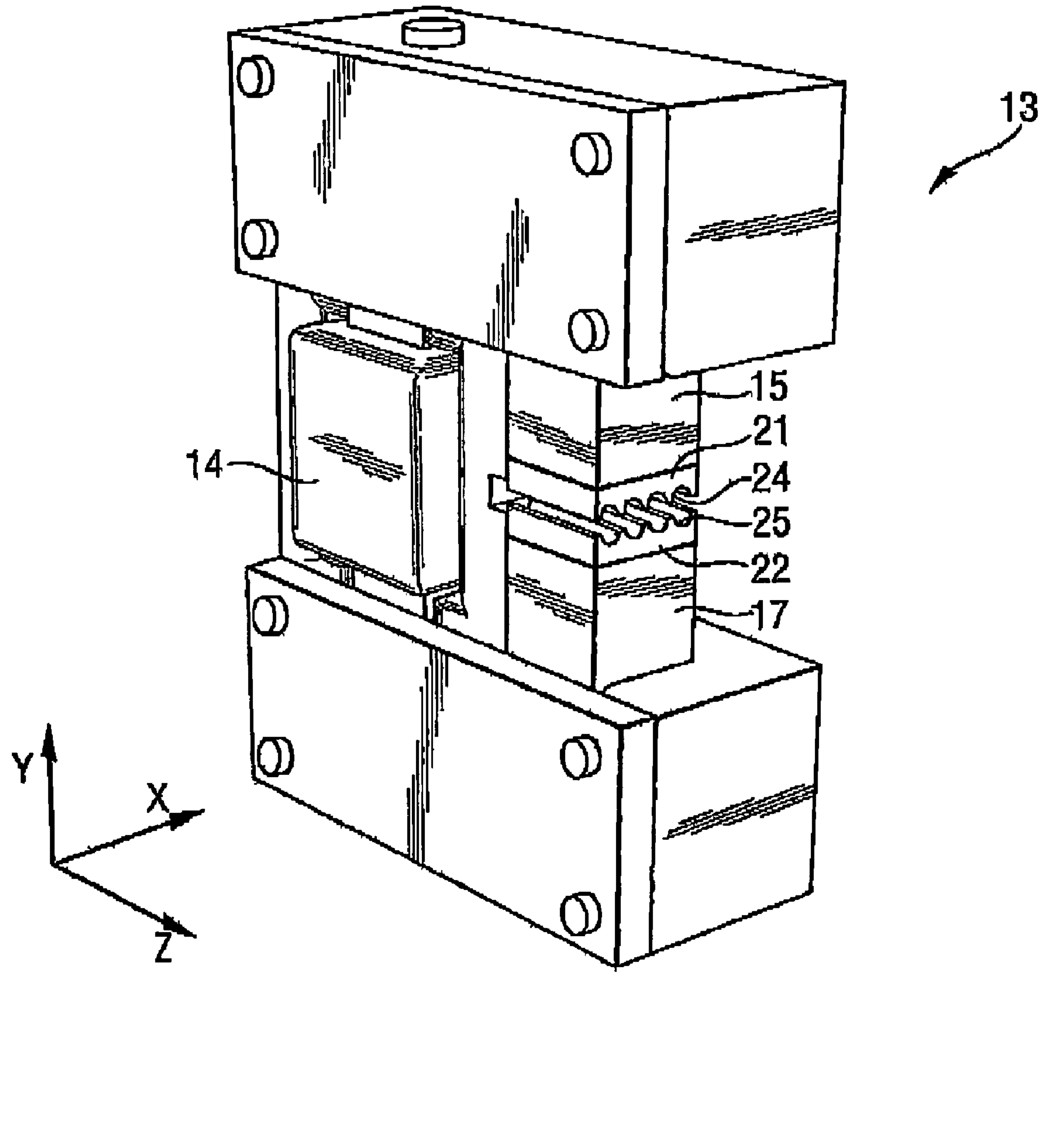
FIG. 6 shows a perspective view of electromagnet 13 as seen in FIG. 1.
Figure 7:
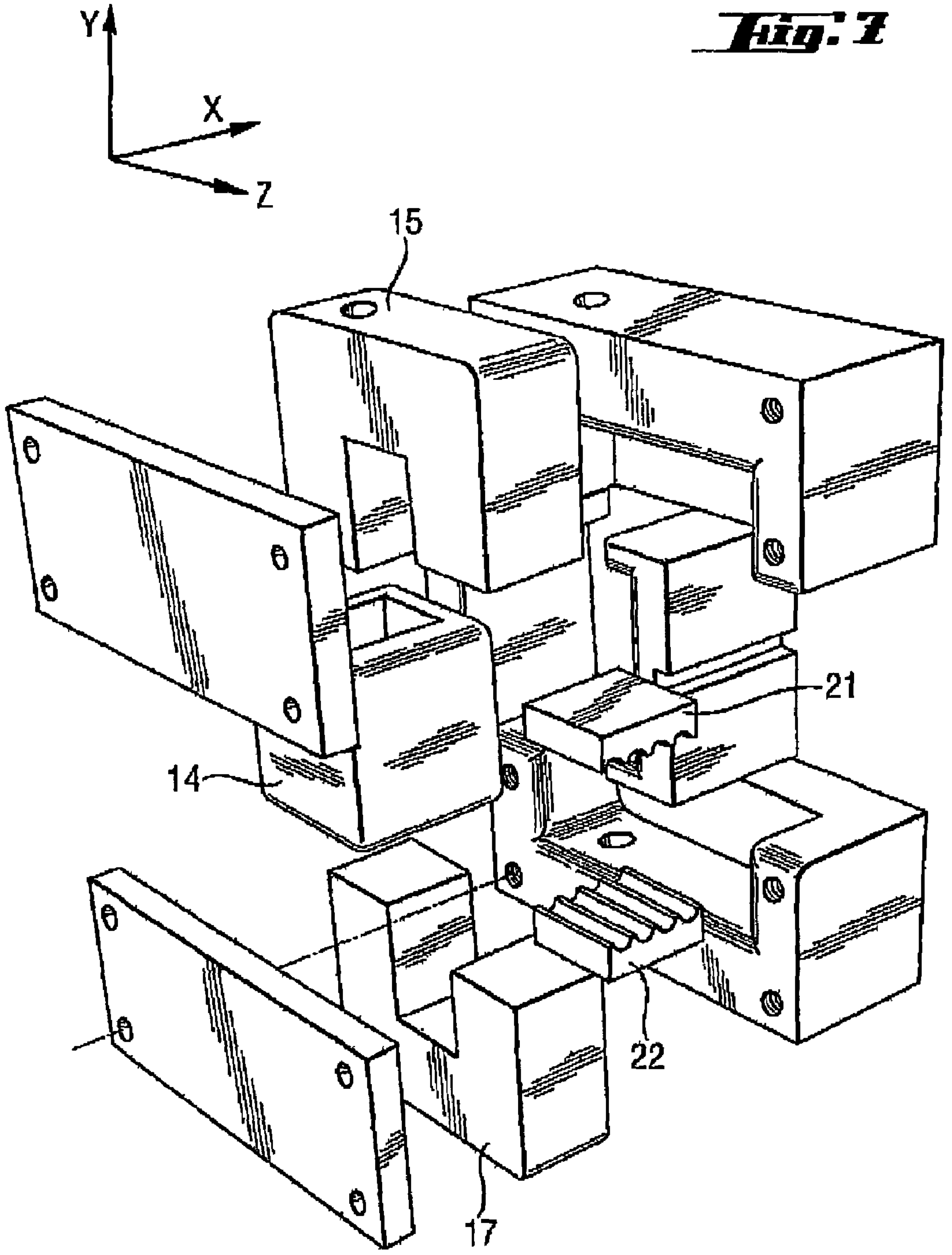
FIG. 7 shows an exploded view of the components of the electromagnet represented in FIG. 6.

FIG. 6 shows a perspective view of electromagnet 13 in FIG. 1. FIG. 7 shows an exploded view of the components of the electromagnet represented in FIG. 6.

In the embodiment shown by FIGS. 6 and 7, cavities 31, 33 respectively 34, 36 are grooves or channels parallel to each other. The length axis of each of such grooves or channels extends along a third direction, e.g. the Z-direction, which is normal to a plane defined by a first axis in the first direction, i.e. the X-direction, and a second axis in the second direction, i.e. the Y-direction.

The grooves of channels have a cross-section which has e.g. the shape of a half circle as shown by FIG. 2 or an undulated or sawtooth shape as shown by FIG. 3.

Second Apparatus Example

Figure 11:
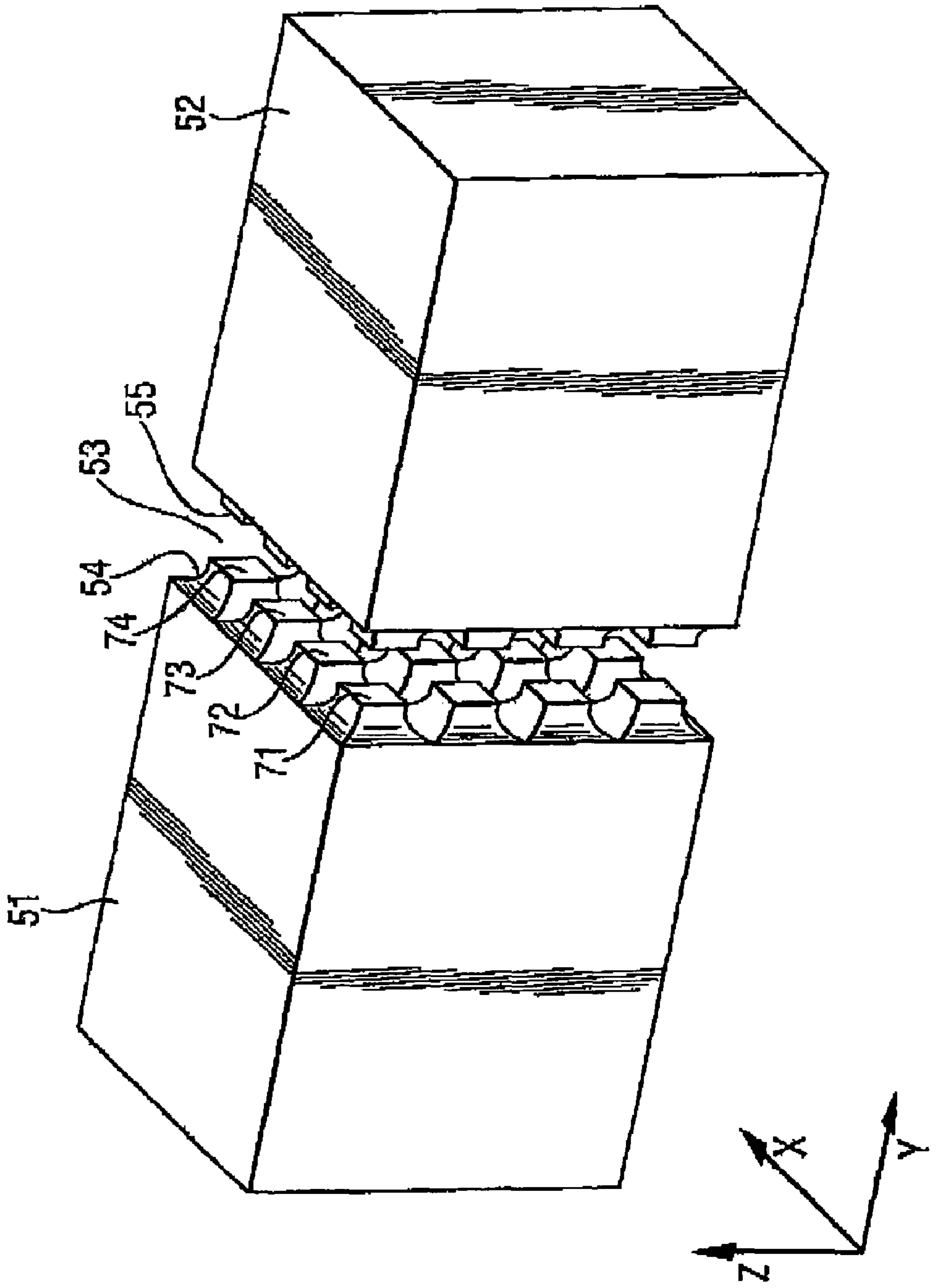
FIG. 11 shows a perspective view of a two-dimensional corrugated pattern of the pole surfaces suitable for generating a magnetic gradient having a three dimensional distribution.

A second example of an apparatus according to the invention is shown by FIG. 11. This embodiment has all basic features described above for the first apparatus example, but outer surfaces of the electromagnet poles 51, 52 which define an air gap 53 are corrugated surfaces 54, 55, each of which comprise tapered pole end parts which are arranged in a matrix array. In this second embodiment the at least two cavities (corresponding to cavities 31, 33 respectively 34, 36 in FIG. 2) and the tapered pole end parts (corresponding to 32 respectively 35 in FIG. 2) are also opposite to and symmetrical with respect to each other and are formed by the intersection of

- a first set of grooves or channels parallel to each other, the length axis of each of those grooves or channels extending along a third direction, e.g. the Z-direction, which is normal to a plane defined by a first axis in the first direction, i.e. the X-direction, and a second axis in the second direction, i.e. the Y-direction, with
- a second set of grooves or channels parallel to each other, the length axis of each of the grooves or channels extending along the first direction (X-direction).

As shown by FIG. 11, each of the grooves or channels of the first set of grooves or channels, and also of the second set of grooves or channels, has e.g. a cross-section with the shape of a half circle. In a variant of this embodiment the latter cross-section has e.g. a wave-like or sawtooth shape.

As shown by FIG. 11, each of the tapered pole end parts 51, 52 (corresponding to tapered pole end parts 21, 22 in FIG. 1) has a flat outer surface facing the air gap 53 (corresponding to air gap 23 in FIG. 1). In a variant of this embodiment, each of the tapered pole end parts ends in a ridge.

In the embodiment represented by FIG. 11 one or more flow-through cells (not represented in FIG. 11) may be inserted into gap 53.

Figure 13:
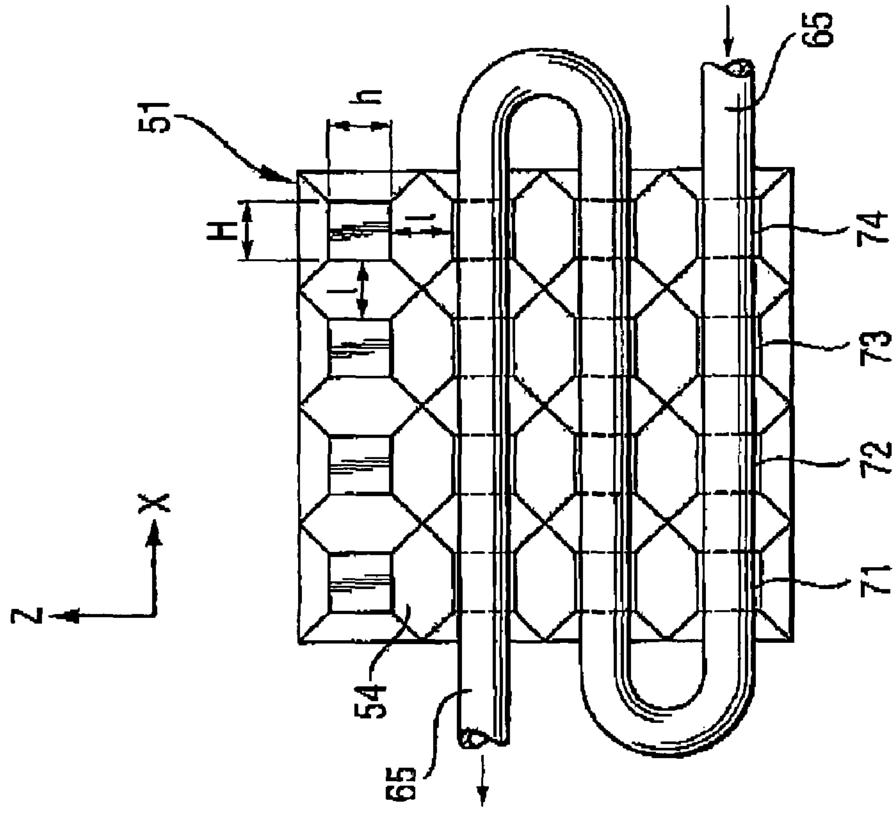
FIG. 13 schematically illustrates use of an apparatus wherein the poles of the electromagnet have outer surfaces having the shape shown in FIG. 11 and a plurality of flow-through cells fluidically connected in series is inserted in the air gap between those outer surfaces.
Figure 12:
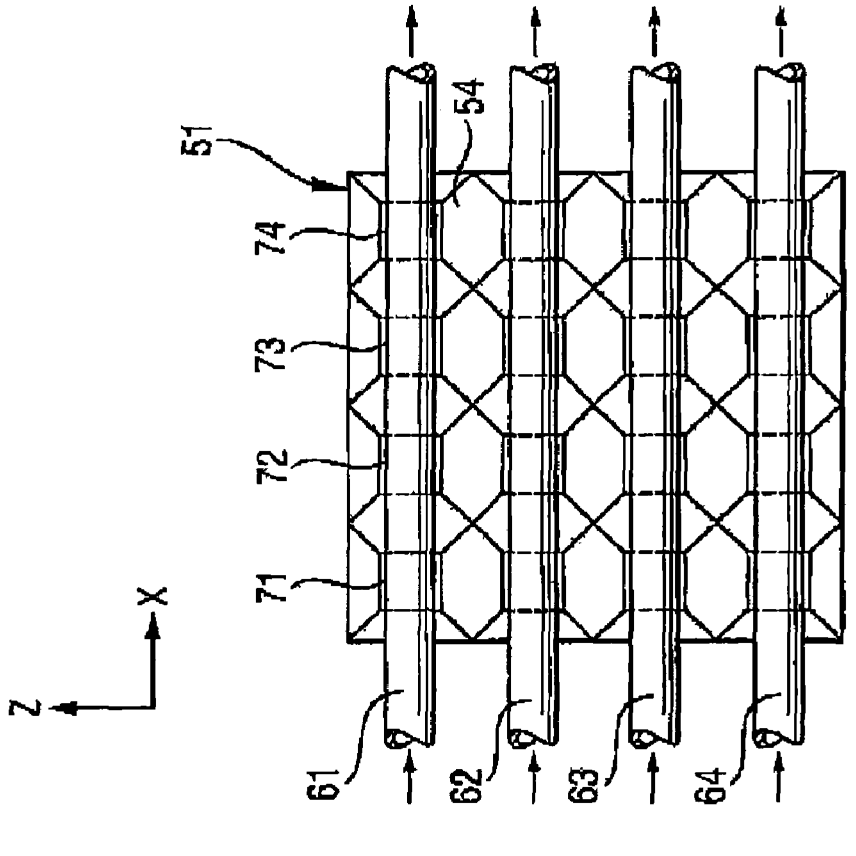
FIG. 12 schematically illustrates use of an apparatus wherein the poles of the electromagnet have outer surfaces having the shape shown in FIG. 11 and a plurality of flow-through cells are inserted in the air gap between those outer surfaces.

Examples of two possible uses of the embodiment represented by FIG. 11 are schematically represented in FIGS. 12 and 13.

In the example shown by FIG. 12 a plurality of flow-through cells 61, 62, 63, 64 having each an inlet and an outlet are inserted in air gap 53 between outer surfaces 54 and 55 in FIG. 11. Several liquid samples, which may be different ones, can thus flow through flow-through cells 61, 62, 63, 64, e.g. in the sense indicated by arrows in FIG. 12. In FIG. 12 the pole tips are represented by rectangles like 71, 72, 73, 74 located close to flow-through cell 61.

In the example shown by FIG. 13 a plurality of flow-through cells fluidically connected in series or a plurality of segments of a single flow-through cell 65 having the meander shape shown in FIG. 13 are inserted in air gap 53 between outer surfaces 54 and 55 in FIG. 11. This flow-through cell arrangement 65 has an inlet and an outlet and a liquid sample can flow therethrough in the sense indicated by arrows in FIG. 13.

In FIG. 13 the pole tips are also represented by rectangles like 71, 72, 73, 74 located close to flow-through cell 65.

In the embodiments represented in FIGS. 12 and 13 each of the rectangles 71, 72, 73, 74 representing a pole tip surface has a width H and a depth h, and the distance separating successive pole tips in the same row or column of the matrix array of pole tips is designated by the letter l.

In the case of an embodiment comprising a single row of pole tips, the depth h may be chosen tp be equal to the width of the channel defined by the flow-through cell, the width H can e.g. lie in a range going from 0.1 to 10 millimeter and the dimension l can be defined e.g. by l=2*H, a uniform distribution of the magnetic particles is obtainable e.g. in a flow-through cell having a diameter of 1 millimeter and a length of 16 millimeter using 8 pole tips each of which has a dimension H=0.1 millimeter, when a mass of about 2 milligrams of magnetic particles are used, an alternating magnetic field is used which has a frequency within a range going from 1 to 15 cycles per second, and the magnetic particles used have e.g. the following characteristics: a diameter of 2 to 5 micrometer and a magnetic force of approximately 0.5 Newton per kilogram.

An example of use of an embodiment comprising a single row of pole tips of the type just mentioned above is the use of such an embodiment for the capture of λ-DNA. In this example the parameters involved have e.g. the following values:

The depth h may be equal to the width of the channel defined by the flow-through cell H=1 millimeter Mass of magnetic particles used: between 2 and 5 milligram Characteristics of the magnetic particles used:

a diameter of 2 to 5 micrometer, and a magnetic force of approximately 0.5 Newton per kilogram.

Diameter of the channel of the flow-through cell=1.5 millimeter

Length of the channel of the flow-through cell=16 millimeter

Number of pole tips=6

Mass of DNA used=2 microgram

Frequency of alternating magnetic field applied in a range going from 1 to 15 cycles per second.

The test results obtained with the above defined operating conditions are:

| Flow rate (ml/minute) | DNA captured % | Amount of DNA captured (mg) |
|---|---|---|
| 0.25 | 59 | 1.18 |
| 0.5 | 31.25 | 0.62 |
| 1 | 31.25 | 0.62 |

Third Apparatus Example

Figure 14:
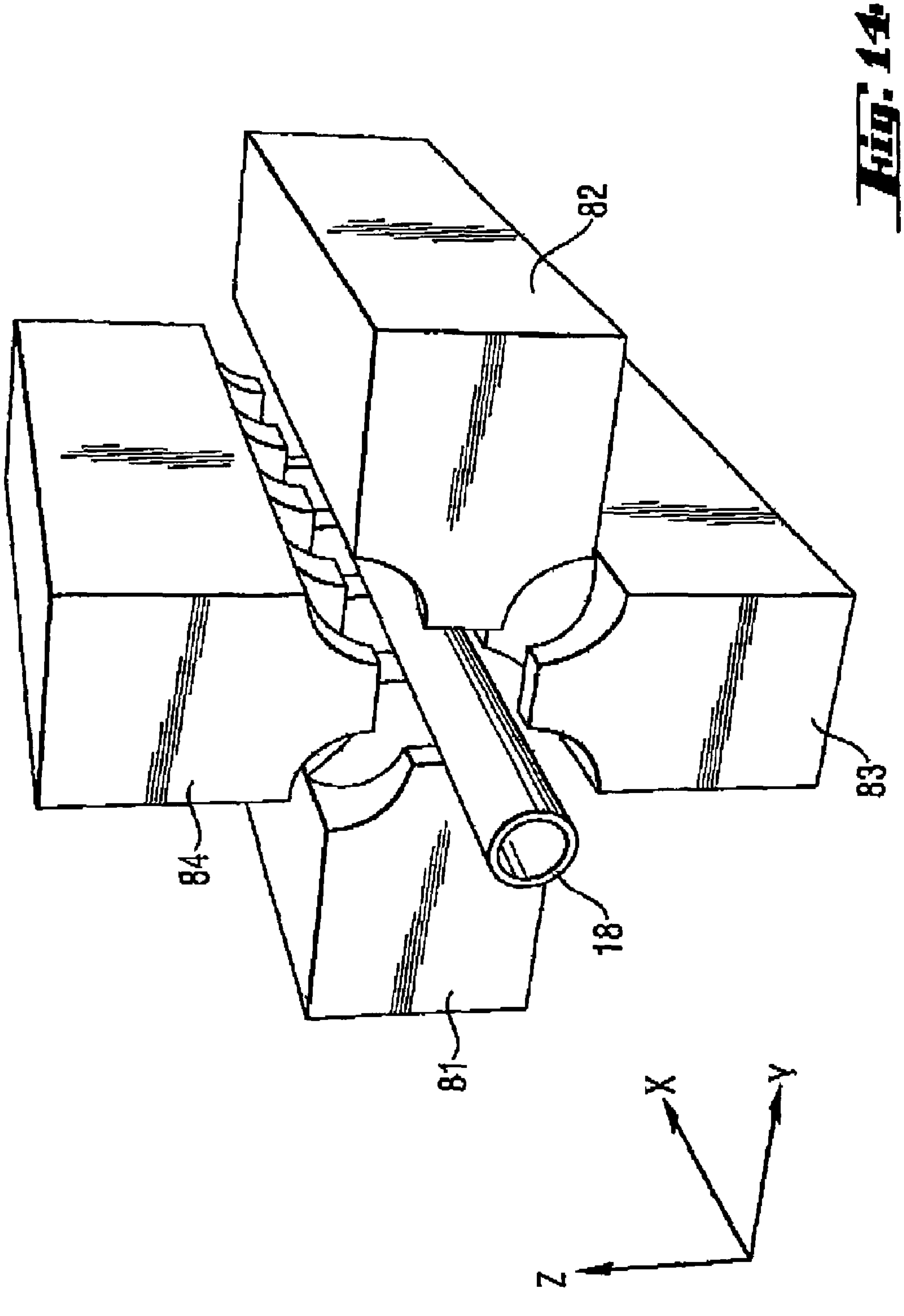
FIG. 14 shows a perspective view of a quadrupole configuration of poles having corrugated surfaces suitable for generating a magnetic gradient having a symmetric distribution enabling a more homogeneous distribution of magnetic particles.

A third example of an apparatus according to the invention is shown by FIG. 14. This embodiment has all basic features described above for the first apparatus example, but comprises e.g. two pairs of poles 81, 82 and 83, 84, each pair belonging to a respective electromagnet which is connected to a respective electrical current source. These are e.g. AC current sources and the magnetic fields created therewith are preferably out of phase, the phase difference being e.g. of 90 degrees. Such magnetic fields cooperate to retain the magnetic particles within flow-through cell 18 and to act on the retained magnetic particles in such a way that they are even more homogeneously distributed in the interior of flow-through cell 18.

Figure 15:
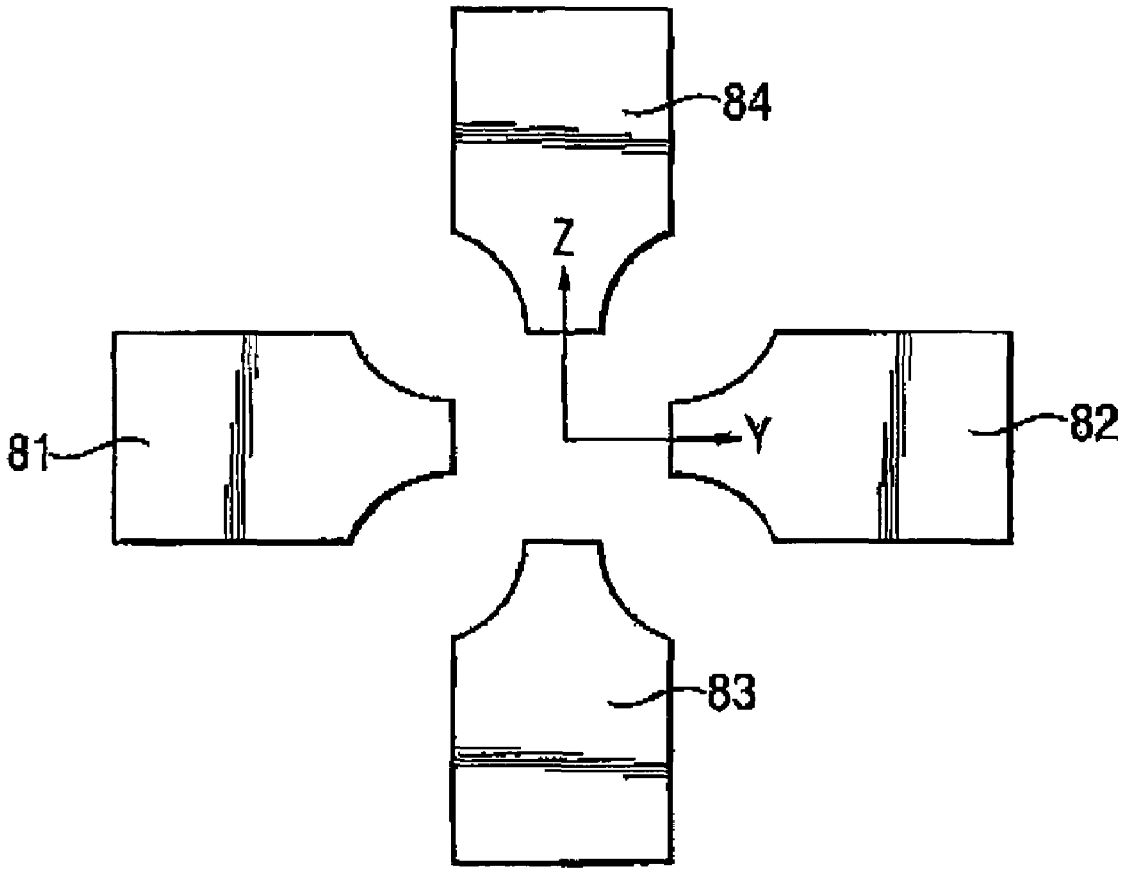
FIG. 15 shows a front view of the quadrupole configuration of poles shown by FIG. 14.

FIG. 15 shows a cross-sectional view of the quadrupole configuration of poles shown by FIG. 14.

Other embodiments similar to the one shown by FIGS. 14 and 15 comprise more than two pairs of poles and consequently more that two electromagnets, which receive electrical currents having phase delays with respect to each other. Since the magnetic field generated has in this case a spherical symmetry, such embodiments make it possible to obtain a better distribution of the retained magnetic particles within the flow-through cell, instead of a distribution of the retained magnetic particles limited to those contained within a cylindrical segment of the flow-through cell, as is the case in the more simple embodiments described with reference e.g. to FIGS. 1 to 7.

Fourth Apparatus Example

A fourth example of an apparatus according to the invention is described hereinafter with reference to FIG. 16 and 17. This embodiment has features similar to those described above for the first apparatus example, but comprises three poles 91, 92 and 93 which belong to an electromagnet arrangement having a magnetic core 97 which has three arms each of which ends in one of the poles 91, 92 and 93. A flow-through cell 98 is arranged in the air gap between poles 91, 92 and 93.

Pole 92 is symmetrically arranged with respect to poles 91 and 93. In more general terms, three or more poles are symmetrically arranged with respect to each other.

Each of the three arms of magnetic core 97 is associated with a respective winding 94, 95 and 96 respectively. Each of these windings is connected to a respective electrical current source (not shown in FIG. 16). These may be e.g. AC current sources and the magnetic fields created therewith may be out of phase, the phase difference being e.g. of 90 degrees. Such magnetic fields cooperate to retain the magnetic particles within flow-through cell 98 and to act on the retained magnetic particles in such a way that they are even more homogeneously distributed in the interior of flow-through cell 98.

Figure 16:
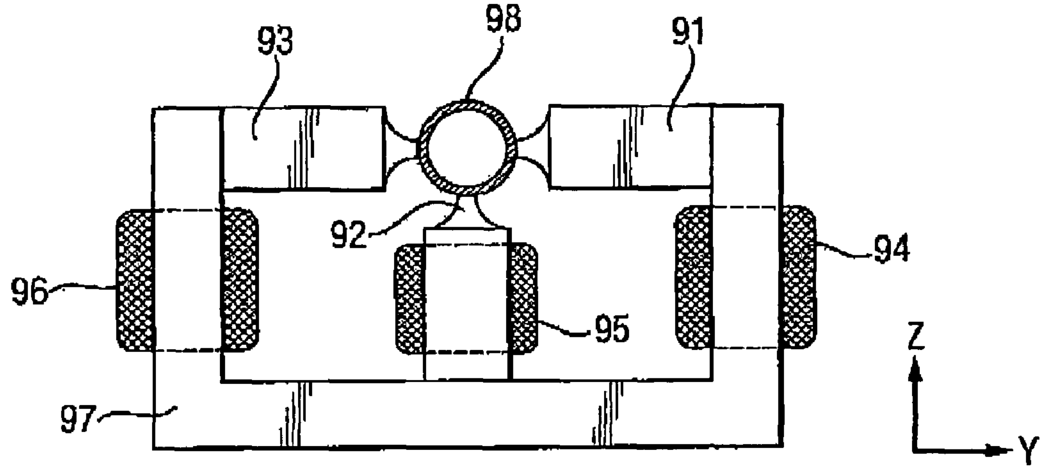
FIG. 16 shows a schematic view of a fourth example of an apparatus according to the invention.
Figure 17:
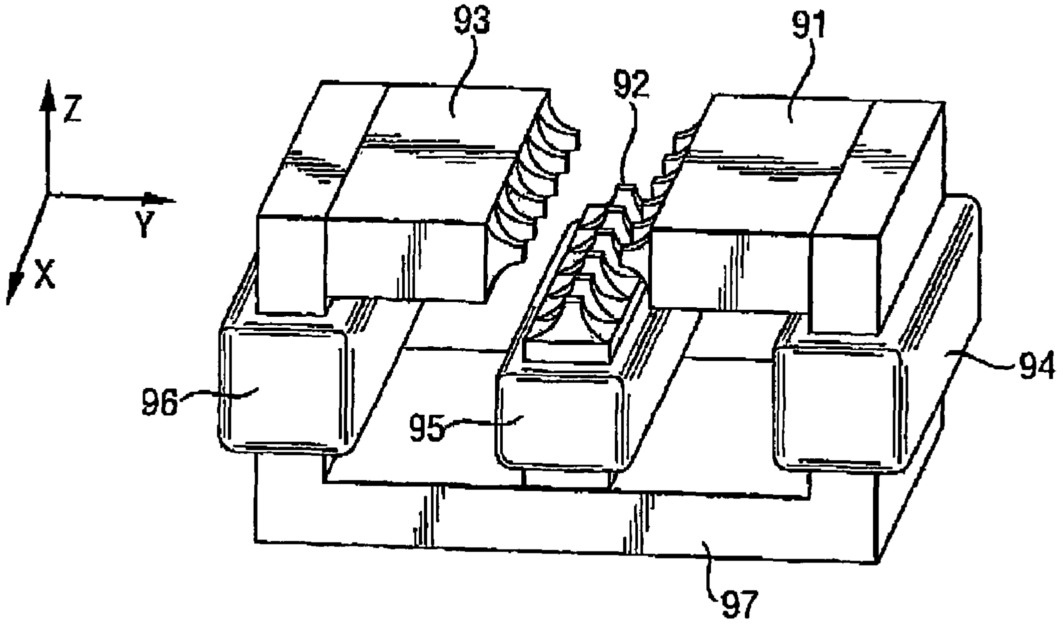
FIG. 17 shows a perspective view of the apparatus shown by FIG. 16.

FIG. 17 shows a perspective view of the three-pole configuration shown by FIG. 16.

The operation of the three-pole embodiment shown by FIGS. 16 and 17 is characterized in that by means of a suitable choice of the time variable electrical currents applied to at least one of windings 94, 95 and 96 respectively, the resulting variable magnetic field generated and applied to the interior of the flow-through cell 98 has no zero value at any time and makes thereby possible to obtain a better distribution of the retained magnetic particles within the flow-through cell.

EMBODIMENTS OF THE APPARATUSES DESCRIBED ABOVE WITH REFERENCE TO FIGS. 1-17

Embodiments of the apparatuses described above with reference to FIGS. 1-17 are characterized by the following features taken alone or in combination:

a) the width H of the outer surface of the tapered poles is equal to the thickness of the air gap, b) the depth h of the outer surface of the tapered poles is substantially equal to the depth of the flow-through cell, c) the distance l between the of the outer surfaces of two adjacent tapered poles is larger than the width H of a tapered pole, d) the specific dimensions and the number of the tapered poles are configured in correspondence with the amount and the desired distribution of the magnetic particles to be retained within the flow-through cell, e) at least two poles are symmetrically arranged with respect to each other, f) at least two poles are used for generating a magnetic field characterized by a predetermined time variation in amplitude and polarity, g) at least two poles are used for generating a magnetic field characterized by a predetermined phase with respect to a given reference, and/or h) the apparatus comprises more than two poles and those poles are used for generating a composite magnetic field having a time variation in amplitude and polarity that is the result of the superposition of phase and time variation in amplitude and polarity of the magnetic fields generated by each pair of the plurality of poles, and the composite magnetic field is preferably suitable for retaining magnetic particles under a flow-through condition and to cause a magnetic particle dynamic behavior which leads to a substantially uniform distribution of the magnetic particles over the cross-section of the flow-through cell.

Example of a First Method According to the Invention

According to the invention a first method for retaining magnetic particles within a segment of a flow-through cell during flow of a fluid through the cell comprises e.g. the following steps:

(a) inserting a flow-through cell into an air gap of at least two electromagnets which have pole tips each having an outer surface that faces the air gap and a shape that enables the generation of an magnetic field gradient in the interior of the flow-through cell, (b) introducing into a flow-through cell an amount of magnetic particles to be retained within a segment of that cell, (c) applying a magnetic field having an amplitude and polarity that vary with time to the space within the cell by means of the at least two electromagnetic poles in order to retain the magnetic particles within a segment of that flow-through cell, and (d) causing a fluid carrying molecules or particles to be captured by the magnetic particles to flow through the flow-through cell, e.g. by pump means connected to the flow-through cell.

In one embodiment of the above-mentioned method the magnetic field applied not only retains, but also uniformly distributes the magnetic particles within a segment of the flow-through cell.

In another embodiment, the variation of the magnetic field with time is a time variation of the amplitude, polarity, frequency of the magnetic field or a combination thereof.

In a further embodiment, the variation of the magnetic field is obtained by a superposition of several magnetic field components, and each component is generated by an electromagnet of a set of electromagnets.

In another embodiment, the structure formed by the retained magnetic particles covering the entire cross-section of the flow-through channel is defined by the configuration of the time-varied magnetic field, which configuration is defined by the parameters characterizing the magnetic field, namely the variation with time of its amplitude, frequency and polarity.

A method of the above-mentioned kind may be carried out with one of the above described examples of an apparatus according to the invention.

The electromagnet, the flow-through cell, the magnetic particles, and the size of the flow of liquid through the flow-through cell may be so configured and dimensioned that the magnetic particles retained within the flow-through cell are distributed substantially over the entire cross-section of the flow-through cell, the cross-section being normal to the flow direction. The magnetic particles retained preferably form a substantially homogenous suspension contained within a narrow segment of the flow-through cell.

The magnetic field applied may be varied with time in such a way that the magnetic particles retained within the flow-through cell form a dynamic and homogeneous suspension wherein the magnetic particles are in movement within a narrow segment of the flow-through cell.

The black surfaces 41 in FIG. 3 schematically represents a segment of flow-through cell 18 wherein the magnetic particles retained are homogeneously distributed either as a stationary array if a static magnetic field is applied or as a dynamic group of moving particles if a variable magnetic field is applied. In the latter case the apparatus according to the invention not only retains the magnetic particles within a segment of the flow-through cell, but also manipulates them by moving the particles with respect to each other during the retention step. This manipulation improves the contacts and thereby the interaction between the target particles and the magnetic particles and provides thereby a highly desirable effect for the diagnostic assays.

As shown in FIG. 3 each of segments 41 extends between opposite pole tips.

FIGS. 8 and 9 illustrate possible distributions of the magnetic particles retained within the flow-through cell depending from the characteristics of magnetic field applied and the amount and density of the magnetic particles available within the flow-through cell. The density of the magnetic particles is their mass divided by the volume wherein they are distributed.

FIG. 8 shows a cross-sectional view of the distribution of the magnetic particles 42 within flow-through cell 18 positioned between poles 21 and 22 of electromagnet 13 in FIG. 1 before a liquid flows through flow-through cell 18 and in two possible situations:

when the magnetic particles are under gravity force alone (arrow 43 shows the sense of gravity force), that is when no magnetic field is applied, or when a static magnetic field is applied and the density of the magnetic particles is lower that a certain limit value.

FIG. 9 shows a cross-sectional view of the distribution of the magnetic particles 42 retained within flow-through cell 18 positioned between poles 21 and 22 of electromagnet 13 in FIG. 1 when an alternating magnetic field is applied according to the invention and even when a relatively low density of magnetic particles is used. As already mentioned above, in the latter case the magnetic particles retained have a dynamic behavior and in particular relative motion with respect to each other. Under the conditions just described the magnetic particles 42 are retained within flow-through cell even when a liquid carrying target particles flows through flow-through cell 18, provided that the intensity of the flow does not exceed a certain limit value.

Figure 10:
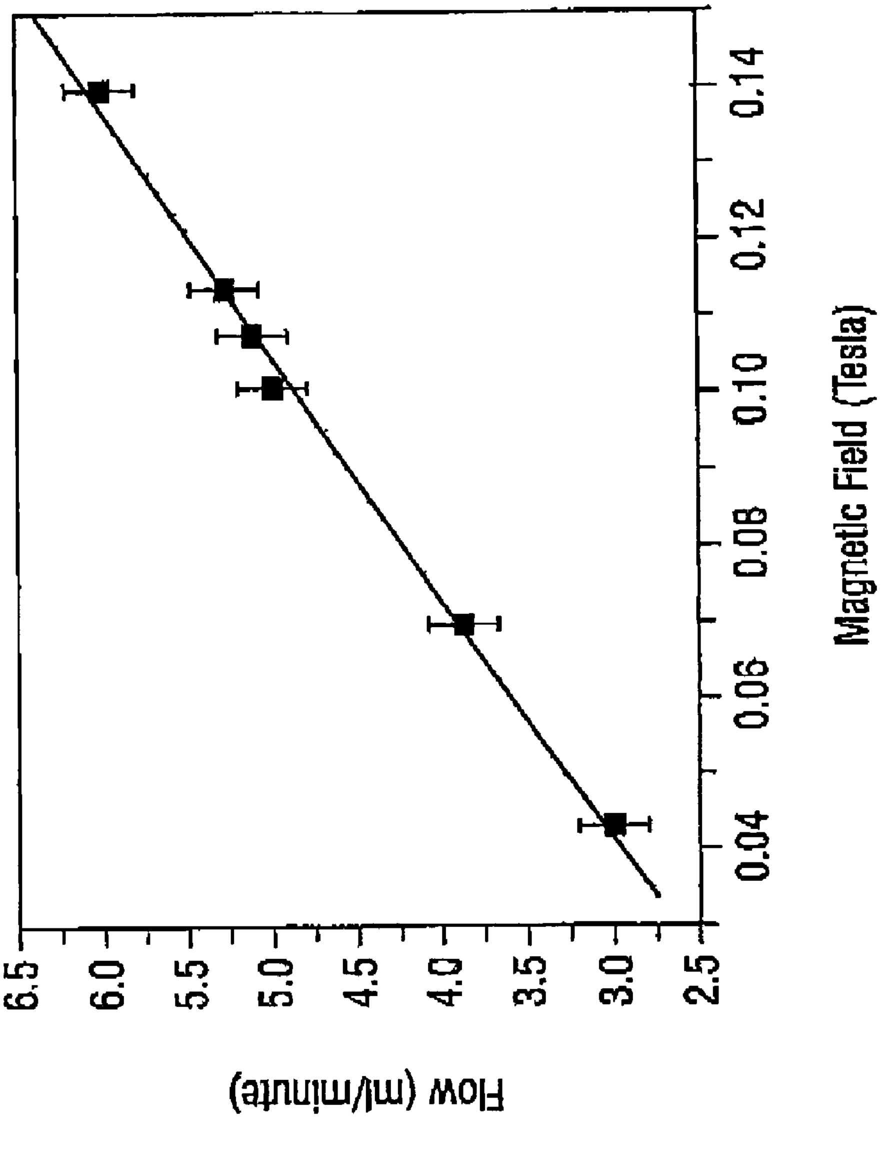
FIG. 10 shows a diagram (flow in milliliter per minute) vs. magnetic field (in Tesla) illustrating the retention capability of an apparatus operating with an alternating magnetic field of 2 cycles per second and a flow-through cell 18 having an internal diameter of 1.5 millimeter.

FIG. 10 shows a diagram (flow of liquid in milliliter per minute vs. magnetic field in Tesla) illustrating the retention capability that can be obtained with an apparatus according to the invention operating with an alternating magnetic field of 2 cycles per second and a flow-through cell 18 having an internal diameter of 1.5 millimeter provided that a sufficient amount of magnetic particles is used. For liquid flow having a value higher than the values delimited by the inclined line in FIG. 10 the flow is strong enough to overcome the forces which retain the magnetic particles within the flow-through cell, and when this happens the flow takes these particles away from flow-through cell 18. The inclined line in FIG. 10 is defined by a number of points represented by black squares. As shown in FIG. 10 these points lie within a range of variation.

In order to attain one of the main aims of the invention, which is to retain within a flow-through cell magnetic particles distributed over its entire cross-section under a certain flow of liquid carrying target particles, the following guidelines should be duly considered:

In order to have a magnetic field gradient which is large enough over the whole depth of the gap, the depth of the air gap between opposite pole tips should not be larger than 0.1 to 10 millimeter, the width H (shown in FIG. 13) of each pole tip surface should not exceed a certain value, H should have a size of a few millimeters, e.g. between 0.1 and 3 millimeter, and the density of particles, i.e. the mass of magnetic particles available within the flow cell divided by the volume of the flow cell, should be larger than a minimum value.

Such a minimum density value corresponds e.g. to a mass of magnetic particles of 2 milligrams for the example described with reference to FIG. 13. If the density of magnetic particles is lower than a minimum value, the magnetic particles are not able to get distributed over the entire cross-section. On the other hand there is also a maximum value of the density of magnetic particles to be observed. For instance, if a mass of magnetic particles larger than e.g. 5 milligrams is used for the example described with reference to FIG. 13, then a part of the magnetic particles cannot be retained by the magnetic forces and is carried away by the liquid flowing through the flow-through cell.

The value of magnetic susceptibility (also called magnetic force) of the magnetic particles plays also an important role for the operation of an apparatus according to the invention. The above indicated aims of the invention are for instance obtained with an alternating magnetic field with an amplitude of 0.14 Tesla and with magnetic particles having a susceptibility of approximately 0.5 Newton per kilogram. If the latter susceptibility and/or the magnetic field amplitude were reduced to lower values, at some point the desired effect of a distribution of the magnetic particles over the entire cross-section of the flow-through cell would not be obtainable.

The size and the number of the magnetic particles can be varied over a relatively large range without affecting the desired operation of an apparatus according to the invention. A decrease of the size of the magnetic particles can be compensated by a corresponding increase in their number and vice versa.

Fifth Apparatus Example

A very localized high magnetic field is necessary for manipulating magnetic particles. When a microchannel is used as flow-through cell, the magnetic field and the magnetic field gradient have to be localized in a microscopic scale, which is not achievable using a large external permanent magnet or electromagnet. As described below, according to the invention, a magnetic field having the above-mentioned properties may be generated by means of microstructured magnetic material layers which are located near to the microchannel and which the magnetic flux generated by an external magnet.

Figure 18:
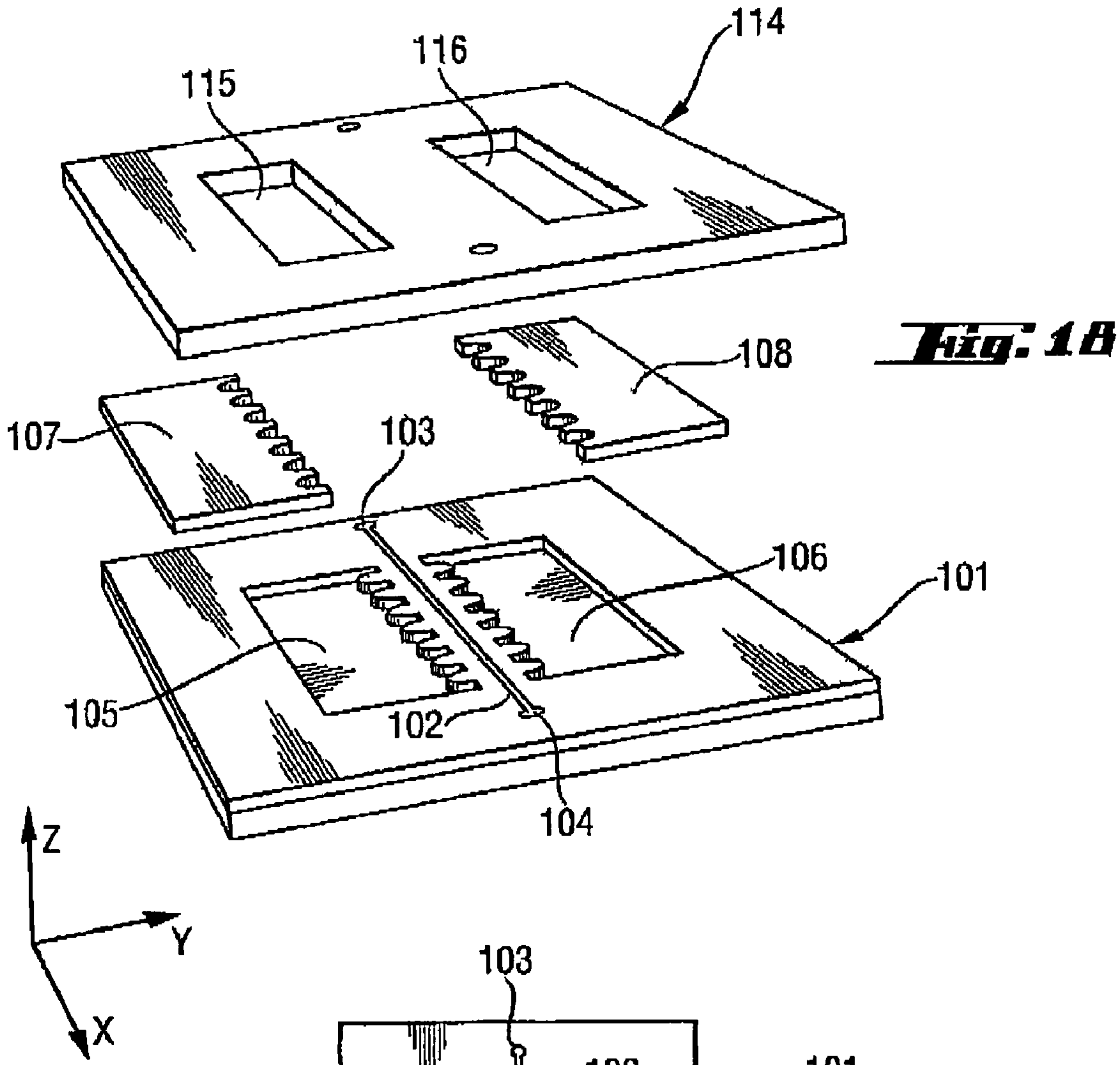
FIG. 18 shows a perspective exploded view of components of a fifth example of an apparatus according to the invention.
Figure 19:
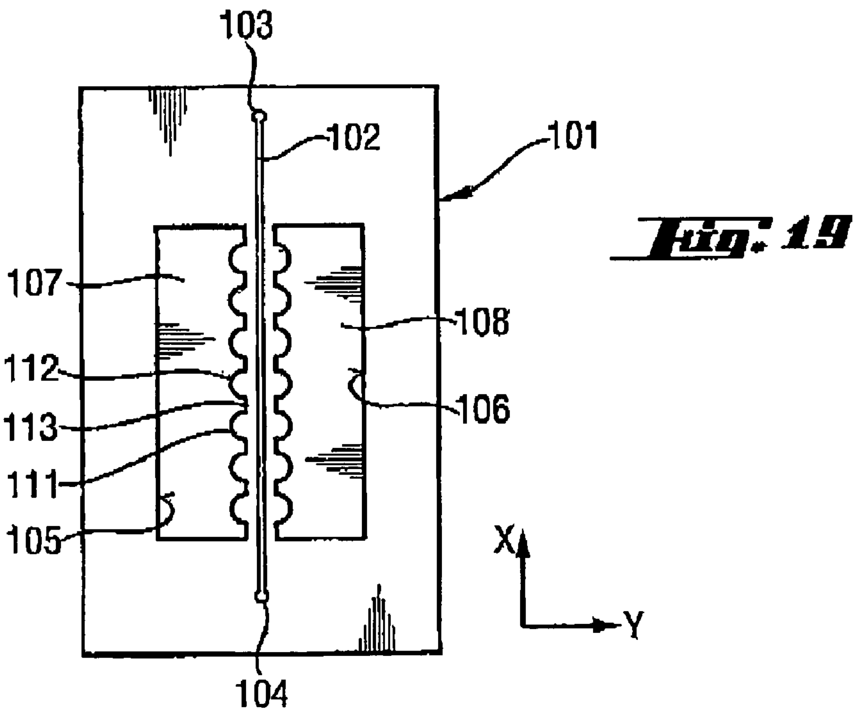
FIG. 19 shows a top view of layer 101 in FIG. 18 and of the ferromagnetic material sheets 107 and 108 inserted in cavities 105 and 106 of layer 101.
Figure 20:
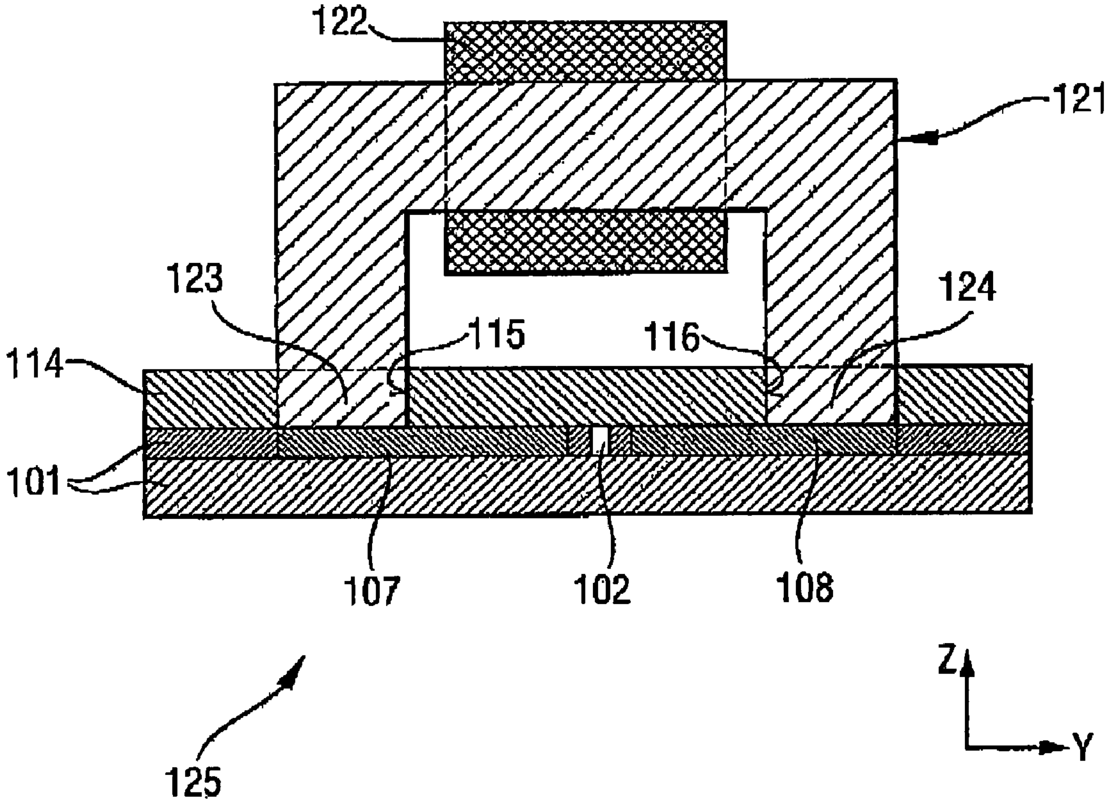
FIG. 20 shows a cross-sectional view of the apparatus shown by FIGS. 18 and 19 further including an electromagnet 121.

FIGS. 18 to 20 show various views of a fifth apparatus according to the invention. This apparatus has a microchip like structure and is suitable for retaining magnetic particles within a segment of a microchannel flow-through cell during flow of a fluid through the cell. As shown by FIG. 18 this apparatus comprises a first layer 101 of a non-magnetic material comprising a rectilinear microchannel 102 which has a predetermined depth and which is suitable for use as a flow-through cell. Microchannel 102 is suitable for allowing flow of liquid and for receiving an amount of magnetic particles to be retained within a segment of microchannel 102. First layer 101 has a first opening 105 and a second opening 106. These openings are located on opposite sides of microchannel 102. Each of openings 105, 106 is adapted for receiving a ferromagnetic material sheet 107 respectively 108 having a shape that matches the shape of the respective opening 105 respectively 106.

The apparatus shown by FIG. 18 further comprises a first ferromagnetic material sheet 107 and a second ferromagnetic material sheet 108 each of which snuggly fits into a corresponding one of openings 105 and 106 respectively and is suitable for use as an end part of an electromagnetic circuit.

Sheets 107 and 108 have each an cuter surface which faces microchannel 102. Microchannel 102 has an inlet 103 and an outlet 104. As shown by FIG. 19, the outer surface of sheet 108 comprises the outer surfaces of at least two cavities 111 and 112 and of a tapered end part 113 which separates cavities 111 and 112 from each other. The cavities and the tapered end part of the first sheet 107 of ferromagnetic material are arranged substantially opposite to and symmetrically with respect to the corresponding cavities and tapered end part of the second sheet 108 of ferromagnetic material. As shown by FIGS. 18 and 19 each of sheets 107 and 108 may have a plurality of cavities 111, 112 and a plurality of tapered end parts 113.

The apparatus shown by FIG. 18 further comprises a second layer 114 of a non-magnetic material which covers the first layer 101 as well as the first and a second ferromagnetic material sheets 107, 108 lodged in openings 105, 106 of first layer 101 of a non-magnetic material.

In one embodiment the first and a second ferromagnetic material sheets 107, 108 each have a thickness which is approximately equal to the depth of microchannel 102.

FIG. 20 shows a cross-sectional view of another embodiment of the apparatus shown by FIGS. 18 and 19. This embodiment further comprises an electromagnet 121 which has magnetic pole ends 123 and 124. In this embodiment, the second layer 114 has two openings 115, 116. Each of pole ends 123, 124 extend through one of openings 115, 116. Pole end 123, pole end 124 are each in contact with one of ferromagnetic material sheets 107, 108. In FIG. 20, the assembly 125 comprises the first layer 101, the second layer 114 and the ferromagnetic material sheets 107 and 108.

The width of each tapered end parts 113 may be equal to the thickness of the gap between the outer surfaces of the first and second ferromagnetic material sheets.

The depth of the tapered end parts 113 may be substantially equal to the depth of microchannel 102.

The distance between two adjacent tapered end parts 113 may be larger than the width of a tapered end part 113.

The specific dimensions and the number of the tapered end parts 113 may be configured in correspondence with the amount and the desired distribution of the magnetic particles to be retained within microchannel 102.

The embodiment described above with reference to FIGS. 18 to 20 is suitable for retaining magnetic particles having a size that lies in the nanometer or micrometer range.

Such particles may be of the kind used for capturing target molecules or target particles carried by the liquid.

Example of a Second Method According to the Invention

According to the invention a second method for retaining magnetic particles within a segment of a microchannel used as a flow-through cell during flow of a fluid through the microchannel comprises e.g. the following steps:

(a) positioning a microchannel used as a flow-through cell between ferromagnetic material sheets each having an outer surface that faces the microchannel, that outer surface having a shape that enables the generation of an magnetic field gradient in the interior of the microchannel when a magnetic field is applied by means of the ferromagnetic material sheets, (b) introducing into the microchannel an amount of magnetic particles to be retained within a segment of that microchannel, (c) applying a magnetic field having an amplitude and polarity that vary with time to the space within the microchannel by means of the ferromagnetic material sheets in order to retain the magnetic particles within a segment of the microchannel, (d) causing a fluid carrying molecules or particles to be captured by the magnetic particles to flow through the microchannel.

In one embodiment the magnetic field not only retains, but also uniformly distributes the magnetic particles within a segment of the microchannel.

Apparatuses or a methods according to the invention are suitable for use in a life science field and in particular for in-vitro diagnostics assays, therefore including applications for separation, concentration, purification, transport and analysis of analytes (e.g. nucleic acids) bound to a magnetic solid phase of a fluid contained in a reaction cuvette or in a fluid system (channel, flow-through cell, pipette, tip, reaction cuvette, etc.).

Although preferred embodiments of the invention have been described using specific terms, such description is for illustrative purposes only, and it is to be understood that changes and variations may be made without departing from the spirit or scope of the following claims.

What is claimed is:

1. An apparatus for retaining magnetic particles within a segment of a flow-through cell during flow of a fluid through said cell comprising (a) an electromagnet comprising a winding connectable to a current source, said electromagnet having at least two poles separated by an air gap which is much smaller than the overall dimensions of the electromagnet, said air gap lying between the outer surfaces of the ends of said at least two poles, each of the latter outer surfaces comprising the outer surfaces of at least two cavities and of a tapered pole end part which separates said at least two cavities from each other, the cavities and the tapered end part of one of the poles being arranged substantially opposite to and symmetrically with respect to the corresponding cavities and tapered end part of the other pole of said at least two poles according to a symmetry axis which extends along a first direction, the depth of the air gap thereby varying at least along said first direction, said depth being measured along a second direction normal to said first direction, and said gap having at least a first symmetry axis which extends along said first direction; and (b) a flow-through cell which is suitable for receiving an amount of magnetic particles to be retained within a segment of the flow-through cell and to allow flow of a liquid through the flow-through cell along said first direction, and a portion of said flow-through cell being inserted in said air gap in such a way that at least one area of the outer surface of each of said tapered pole parts is in contact with or close to the outer surface of a wall of said flow-through cell and the length axis of said flow-through cell portion extends along said first direction.

2. The apparatus according to claim 1, wherein the size of the magnetic particles is less than or equal to about 5 μm.

3. The apparatus according to claim 1, wherein the magnetic particles are effective to capture target molecules or target particles present in said liquid.

4. The apparatus according to claim 1, wherein the air gap has an average thickness between 0.1 and 10 millimeters.

5. The apparatus according to claim 1, wherein the width of the of the outer surface of the tapered poles is equal to the thickness of the air gap.

6. The apparatus according to claim 1, wherein the depth of the outer surface of the tapered poles is substantially equal to the depth of the flow-through cell.

7. The apparatus according to claim 1, wherein the distance between the outer surfaces of two adjacent tapered poles is greater than the width of a tapered pole.

8. The apparatus according to claim 1, wherein the specific dimensions and the number of the tapered poles are configured in correspondence with the amount and the desired distribution of the magnetic particles to be retained within the flow-through cell.

9. The apparatus according to claim 1, wherein said at least two poles are symmetrically arranged with respect to each other.

10. The apparatus according to claim 1, wherein said at least two poles are used for generating a magnetic field characterized by a predetermined time variation in amplitude and polarity.

11. The apparatus according to claim 1, wherein said at least two poles are used for generating a magnetic field characterized by a predetermined phase.

12. The apparatus according to claim 1, said apparatus comprising more than two poles and said poles being effective for generating a composite magnetic field having a time variation in amplitude and polarity that is the result of the superposition of phase and time variation in amplitude and polarity of the magnetic fields generated by each pair of said plurality of poles.

13. The apparatus according to claim 12, wherein said composite magnetic field is suitable for retaining magnetic particles under a flow-through condition and with a substantially uniform distribution of the magnetic particles over the cross-section of the flow-through cell.

14. The apparatus according to claim 1, wherein the electrical current source is a source adapted to provide a current which is variable with time.

15. The apparatus according to claim 14, wherein the electrical current source is an alternating current source.

16. The apparatus according to claim 15, wherein the alternating current source is adapted to supply a current having a selectable frequency comprised between 0.00 1 cycle per second and 100 kilocycles per second.

17. The apparatus according to claim 14, wherein the electric current source is an switchable DC current source.

18. The apparatus according to claim 1, wherein the electric current source is a DC current source.

19. The apparatus according to claim 1, wherein the cavities and tapered pole end parts form a corrugated surface.

20. The apparatus according to claim 19, wherein said corrugated surface has a thickness comprised between 0.1 and 10 millimeters.

21. The apparatus according to claim 1, wherein each of said tapered pole end parts has a three-dimensional shape.

22. The apparatus according to claim 1, wherein said at least two cavities are grooves or channels parallel to each other, the length axis of each of said grooves or channels extending along a third direction which is normal to a plane defined by a first axis in said first direction and a second axis in said second direction.

23. The apparatus according to claim 22, wherein each of said grooves or channels has a cross-section having the shape of a half circle.

24. The apparatus according to claim 22, wherein each of said grooves or channels have a cross-section having an undulated shape or a sawtooth shape.

25. The apparatus according to claim 1, wherein said at least two cavities and said tapered pole end parts are formed by the intersection of a first set of grooves or channels parallel to each other, the length axis of each of said grooves or channels extending along a third direction which is normal to a plane defined by a first axis in said first direction and a second axis in said second direction, with a second set of grooves or channels parallel to each other, the length axis of each of said grooves or channels extending along said first direction.

26. The apparatus according to claim 25, wherein each of said grooves or channels of said first set of grooves or channels and of said second set of grooves or channels has a cross-section having the shape of a half circle.

27. The apparatus according to claim 25, wherein each of said grooves or channels of said first set of grooves or channels and of said second set of grooves or channels has a cross-section having a wave-like or sawtooth shape.

28. The apparatus according to claim 25, wherein each of said tapered pole end parts has a flat outer surface facing said air gap.

29. The apparatus according to claim 25, wherein each of said tapered pole end parts ends in a ridge.

30. The apparatus according to claim 1, wherein each of said tapered pole end parts is made of a ferromagnetic material.

31. The apparatus according to claim 30, wherein said material is a ferrite.

32. The apparatus according to claim 1, wherein said cavities are made by powder blasting.

33. A method for capturing target molecules or target particles carried by a liquid, comprising:

(a) forming an homogeneous suspension of magnetic particles distributed over a cross-section of a flow-through cell, said homogeneous suspension of magnetic particles being formed by (1) inserting a flow-through cell into an air gap of at least two electromagnetsic poles which have poles end parts having tapered poles end parts facing the said air gap and arranged symmetrically with respect to the axis of said flow cell, said tapered end part having a shape that enables the generation of an magnetic field gradient in the interior of the flow-through cell, (2) introducing into said flow-through cell an amount of magnetic particles to be retained within a segment of said flow-through cell, (3) applying a magnetic field having an amplitude and polarity that vary with time to the space within said cell by means of said at least two electromagnetic poles in order to retain said magnetic particles within a segment of said flow-through cell, and (b) causing said liquid carrying target molecules or target particles to flow through said homogeneous suspension of magnetic particles retained within said segment of said flow-through cell.

34. The method according to claim 33, wherein said magnetic field uniformly distributes said magnetic particles within a segment of the flow-through cell.

35. The method according to claim 33, wherein said outer surface of said pole tips is a corrugated surface.

36. The method according to claim 33, wherein the electromagnetsic poles, the flow-through cell, the magnetic particles, and the size of the flow of liquid through the flow-through cell are so configured and dimensioned that the magnetic particles retained are distributed substantially evenly over the entire cross-section of the flow-through cell, said cross-section being normal to the flow direction.

37. The method according to claim 36, wherein the magnetic particles retained form a substantially homogenous suspension contained within a segment of the flow-through cell which is substantially normal to the flow direction.

38. The method the according to claim 37, wherein the magnetic field applied is varied with time in order to cause the retained magnetic particles to form a dynamic and homogeneous suspension wherein the magnetic particles are in movement within said segment.

39. The method according to claim 38, wherein the variation of the magnetic field with time is a time variation of at least one of the amplitude, polarity, and frequency of the said magnetic field.

40. The method according to claim 38, wherein the variation of the magnetic field is obtained by a superposition of several magnetic field components, each component being generated by one electromagnet of a set of electromagnets.

41. The method according to claim 38, wherein the structure formed by the retained magnetic particles covering the entire cross-section of the flow-through channel is defined by the configuration of the time-varied magnetic field, which configuration is defined by variations in one or more of the amplitude, frequency and polarity of the magnetic field.

42. A method for maximizing the surfaces of magnetic particles that are contacted by liquid which carries target molecules or target particles and flows through a flow-through cell using a device according to claim 1 comprising:

(a) forming a structure of magnetic particles distributed over a cross-section of said flow-through cell, said structure being formed by (1) inserting a flow-through cell into an air gap of at least two electromagnets which have pole tips having each an outer surface that faces said air gap and a shape that enables the generation of an magnetic field gradient in the interior of the flow-through cell, (2) introducing into said flow-through cell an amount of magnetic particles to be retained within a segment of said flow-through cell, (3) applying a magnetic field having an amplitude and polarity that vary with time to the space within said cell by means of said at least two electromagnets in order to retain said magnetic particles within a segment of said flow-through cell, and (b) causing said liquid carrying target molecules or target particles to flow through said structure of magnetic particles retained within said segment of said flow-through cell.

* * * * *